June 5, 1945.  H. L. CLARK  2,377,757
SHORT TIME INTERVAL METER
Filed Dec. 1, 1943
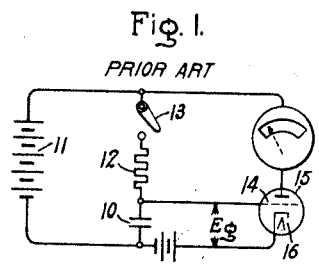
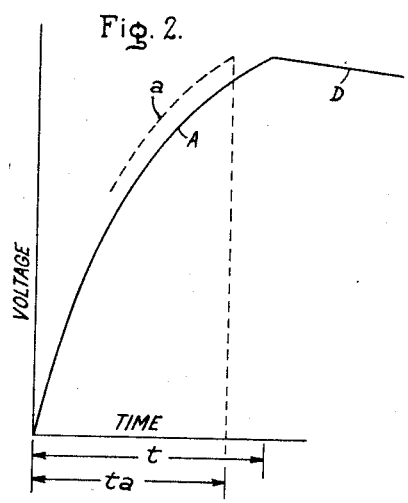
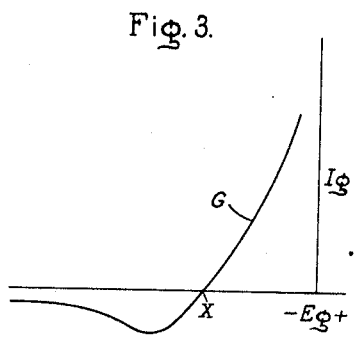
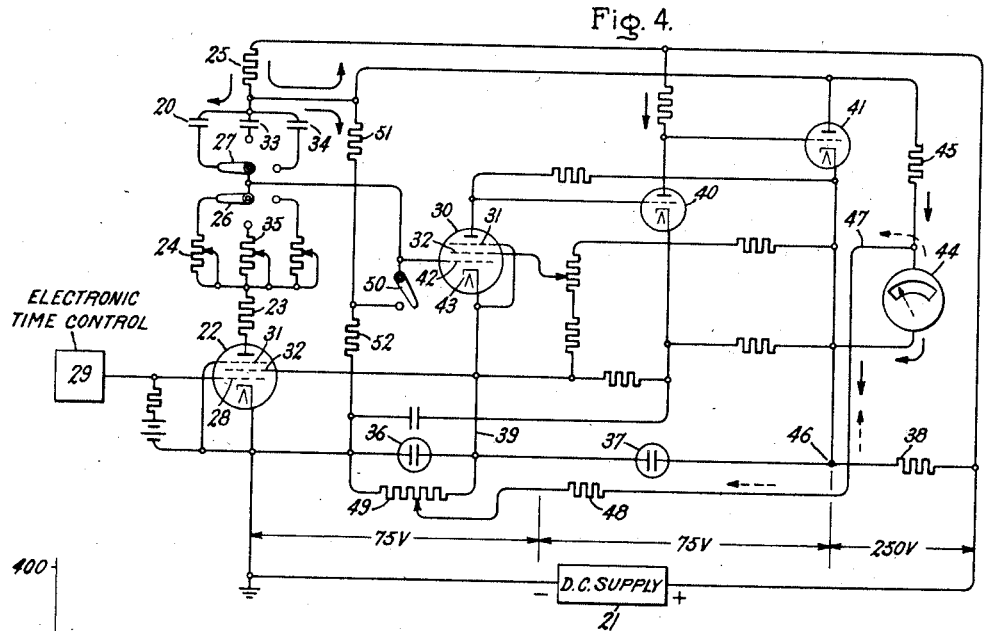
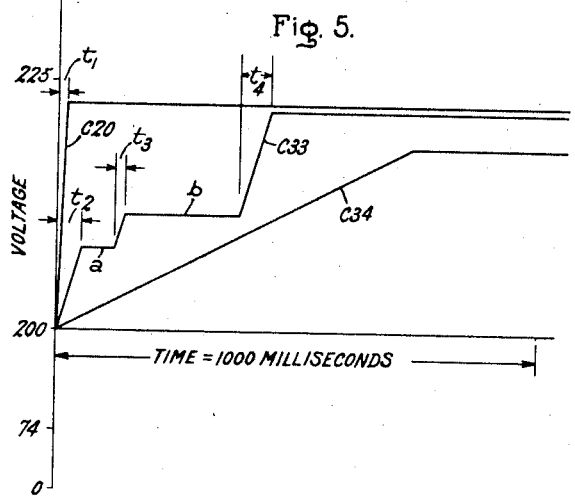
Inventor:
Howard L. Clark,
by Harry E. Dunham
His Attorney.

Patented June 5, 1945

2,377,757

UNITED STATES PATENT OFFICE 2,377,757

SHORT TIME INTERVAL METER

Howard L. Clark, Ballston Lake, N. Y., assignor to General Electric Company, a corporation of New York Application December 1, 1943, Serial No. 512,512

11 Claims. (Cl. 161—15)

My invention relates to timing apparatus and in particular to that class of short interval time meters in which a condenser is charged during the time interval to be measured, and the interval ascertained from a measurement of the voltage charge on the condenser at the end of the time interval. One object of my invention is to provide for a constant condenser charging rate so that there will be a linear relation between condenser voltage and the time interval to be measured.

Another object of my invention is to so arrange the condenser voltage measuring apparatus as to avoid discharging the condenser incident to the measuring of its voltage or otherwise. By such arrangement the condenser voltage does not drift to a lower value by reason of drawing a measurement current therefrom, so that unhurried high accuracy measurements and the integration of spaced time intervals are made possible.

In carrying my invention into effect, I prefer to provide electronic control means for maintaining the condenser charging rate constant, and which control means is adjusted so as to draw a negligible current from the condenser. I further maintain one side of the condenser at a substantially fixed voltage relative to that side of the supply line from which the condenser is disconnected at the end of a charging operation, so that the voltage across the condenser can be measured by a voltmeter connected between the other side of the condenser and the disconnected supply line without drawing current from the condenser.

The features of my invention which are believed to be novel and patentable will be pointed out in the claims appended hereto. For a better understanding of my invention, reference is made in the following description to the accompanying drawing in which Fig. 1 represents what may be considered a prior art condenser timing device which is included as being helpful in explaining my invention. Fig. 2 represents time-voltage curves characteristic of the voltage across the condenser of Fig. 1 during a time measurement operation. Fig. 3 represents a grid voltage-grid current curve characteristic of electronic tubes such as are used in Fig. 1 and in my invention. Fig. 4 represents a preferred embodiment of my invention, and Fig. 5 represents time-voltage measurement curves and comparative voltage values characteristic of my invention.

Referring now to Fig. 1, which I believe to be a fair representation of the prior art as compared to my invention, 10 represents a condenser adapted to be connected to a direct-current source of supply 11 through a resistance 12 and switch 13. Assuming the condenser to be fully discharged, if the supply 11 be constant and the switch 13 be closed for a time interval less than that required to fully charge the condenser to the voltage of source 11, the voltage across the condenser at the end of the time interval will be a measure of the time interval. At the right of the condenser is represented a thermionic voltmeter which is intended for measuring the condenser voltage in terms of such time interval and for this purpose the electronic voltmeter is supplied from the source 11, and the grid 14 and cathode 16 of the electronic tube 15 of such voltmeter are connected across the condenser, so that the tube current will be proportional to condenser voltage. There are certain disadvantages to such an arrangement which are avoided by my invention.

In the first place, the relation between the condenser voltage and time during the charging period is not linear, which introduces complications into the calibration of the device, makes the integration of separate time intervals impossible, and also renders it subject to any variation in the voltage of the supply source. This is illustrated in Fig. 2 where curve A may represent the voltage across the condenser 10 of Fig. 1 as it is charged during a time $t$. It is seen that the charging rate is high at the start but decreases at an accelerating rate as the condenser becomes charged. Hence, the condenser voltage is not strictly proportional to time as would be the case if curve A were a straight line. Moreover, if the voltage of the source changes, the curve A will change. Thus dotted line curve $a$ shows that with a slightly higher voltage the condenser will reach the same voltage in the lesser time $t_a$. Another difficulty about the arrangement of Fig. 1 is that the tube 15 draws current from the condenser through grid 14, and this grid current varies for every different condenser voltage. This is represented in Fig. 3 which shows the characteristic curve G of variation in grid current $Ig$ with different voltages $Eg$ between cathode and grid. The only time that grid 14 does not supply or draw current to or from the condenser 10 in Fig. 1 is when its $Eg$ is at the negative value $x$. As a result the voltmeter which is used to measure the condenser voltage robs the condenser of charging current during the charging period and also at the end of the charging period before a reading can be taken, so that the voltage across the condenser starts to drift to a lower value immediately switch 13 is opened, as represented by the extension D of curve A beyond the time $t$ in Fig. 2. This drift will continue at a varying rate until grid 14 is at potential $x$, Fig. 3, with respect to its cathode. This means, of course, that the meter must be read very quickly, which is not consistent with good accuracy. The calibration of the thermionic voltmeter of Fig. 1 is also subject to changes in characteristics of the tube 15.

I overcome these difficulties by employing a constant condenser charging rate and measuring the voltage without robbing the condenser of charging current or disturbing the charge on the condenser, such as represented by curve C34, Fig. 5, in the manner now to be explained.

In Fig. 4 there is provided a condenser 20 arranged to be connected across a source of direct-current supply 21 through an electronic tube 22 used as a switch to start and stop the charging of the condenser at the beginning and end of the time interval to be measured. The charging circuit also includes resistances 23, 24, and 25, resistance 24 being initially adjustable, and range selective switches 26 and 27. Tube 22 which corresponds to the switch 13 of Fig. 1 is controlled by the time function to be measured, and its control grid 28 is connected into a box 29 which may represent electronic or other high speed switching or control apparatus to so bias the control grid of tube 22 to turn tube 22 on at the beginning of the time interval to be measured and cut it off at the end of such time interval. Tube 22, as well as tube 30 to be referred to, preferably has suppresser and screen grids 31 and 32 as represented. To cover different timing ranges, any one of three or more condensers 20, 33, and 34, may be selected, and I have found it convenient to provide condensers having capacitance ratios in the relation of 1, 10, and 100. Thus condenser 34 may be a 10-mfd. condenser, 33 a 1-mfd. condenser, and 20 a 0.1-mfd. condenser. When switch 27 is shifted to select a different condenser and timing range, switch 26 is also shifted to select the proper calibrated series charging resistance such that the voltage drop through the different charging resistances 23—24 or 23—35, etc., will always be the same for reasons that will be explained.

For the purpose of illustrating a practicable example, certain values have been and will be given herein for different circuit elements and voltages used, but I do not wish to confine my invention to any particular values in this respect.

The direct-current supply source 21 will be assumed to be a 400-volt source grounded at its negative side at the cathode of tube 22. Across source 21 is a voltage divider regulating circuit including glow tubes 36 and 37 and a resistance 38 to obtain different voltages desirable in the operation of the apparatus. For example, the voltages across each of the glow tubes are approximately 75 volts so that +75 volts are applied to the screen grid of tube 32 and to the cathode of tube 30 through connection 39.

The tubes 30, 40, and 41 are connected in cascade control arrangement across the selected condenser, such as condenser 20, and serve to maintain the charging rate for the selected condenser constant without drawing any appreciable current from the condenser charging circuit. It is noted that the control grid 42 of tube 30 is connected to the lower end of the condenser, such as 20, which is being used and between such condenser and the resistance 24. Thus grid 42 is connected to the connection between switches 26 and 27. One important aspect of my invention is to maintain the voltage at this point such with respect to cathode 43 of tube 30 that no appreciable current flows through this grid connection or, in other words, grid 42 is maintained very closely at a potential $x$ as explained in connection with Fig. 3 with respect to the voltage of cathode 43. Since cathode 43 is maintained at about +75 above ground by reason of its connection thereto through 75-volt glow tube 36, the potential of grid 42 is to be maintained at approximately 74 volts above ground. The adjustment of the voltage of screen grid 32 of tube 30 is helpful in obtaining the final adjustment necessary to reduce the current of grid 42 to zero. This means then that the charging of condenser 20 through resistors 24 and 25 should be at such a rate that the voltage drop through such resistors and electronic switch 22 is approximately 74 volts. This is also the case if condenser 38 and resistors 35 are selected. Resistors 24, 35, etc. are made adjustable to assist in obtaining the desired current flow initially.

Another feature of my invention is that, when a condenser charging timing operation starts, the condenser used has an initial or normal charge such as to make its lower terminal correspond to this desired voltage. This is accomplished by switching the grid 42 connection to a voltage divider by a switch 50. The voltage divider comprises resistance sections 25, 51, and 52 connected across the source of supply in series and so proportioned that the point of connection to the grid circuit by switch 50 is at 74 volts to ground in the example given under normal conditions. When switch 50 is closed, if the charge on the condenser is below a predetermined value, charging current will flow thereto through resistors 25 and 52. If above a predetermined value, the condenser will discharge through resistance section 51 until the charge on the condenser equals the normal voltage drop across resistor 51, when the only current flowing therethrough is that which would flow with switches 50 and 22 open but with tube 41 drawing maximum current through resistor 25. Thus before each timing operation, switch 50 is closed for a moment to assure a definite predetermined charge on the condenser to be used.

The cascade tube circuit may be considered as a type of inverse feedback circuit and serves to raise the voltage at the upper side of the condenser being charged during the time interval under measurement in direct proportion to such time and the charge on the condenser, while the voltage at the lower side of the condenser is maintained constant within very small limits.

The operation is as follows. The voltage on grid 42 tends to decrease when electronic switch 22 is closed, causing tube 30 to draw less current and causing the voltage on the control grid of tube 40 to rise. This causes tube 40 to draw more current, decreasing the voltage on the control grid of tube 41. The current of tube 41 thus decreases. Tube 41 draws current through the same regulator resistor 25 which is in the condenser charging circuit. The regulating current thus passed by the tube regulator is in addition to any condenser charging current in resistance 25. As a consequence, when the current through tube 41 decreases, the voltage at the upper side of the condenser increases. A tendency of the charging rate to be too high increases the voltage of grid 4 and increases the current flow through tubes 30 and 41 and corrects the tendency. Likewise, a tendency of the charging rate to be low decreases the voltage of grid 42 and decreases the current flow in tubes 30 and 41 and corrects the tendency. As a result the condenser is charged at a constant rate during the time interval, the voltage of grid 42 being maintained constant within very narrow limits at the voltage where negligible grid current is taken from the condenser charging circuit. As the condenser is charged, the current drawn by tube 41 through resistor 25 decreases, which causes the upper terminal of the condenser to rise in voltage with the increased charge. At the end of the time interval, tube switch 22 is opened and since grid 42 is at the potential where it draws no current, there is no leaking off or drift of the condenser charge and the voltage increase at its upper terminal during the time interval can be accurately measured without undue haste. At the end of the time interval, the cascade tube circuit still functions to draw sufficient current through resistor 25 to maintain the voltage on the upper end of the condenser at the value existing at the end of the timing interval. Thus the cascade tube regulating circuit serves to push the voltage at the high side of the condenser up at a constant rate during the charging period and to hold it there at the end of the time interval without drawing any appreciable current from the condenser charging circuit at any time, and since the voltage at the lower end of the condenser is fixed by the voltage relation between cathode and grid of tube 30, and the cathode voltage is held at a predetermined voltage above ground by regulating tube 36, the increase in voltage at the upper end of the condenser with respect to ground is an accurate measure of the time interval.

While not previously mentioned, it will be noted that tubes 30 and 40 are suitably connected to the supply source to function as above described.

It is seen now that the arrangement described provides for the charging of the measuring condenser at a constant rate, and it will be evident that this is independent of normally expected voltage variations in the source of supply and expected changes in tube characteristics. Also, that the connection of grid 42 does not cause drift of the condenser voltage prior to or during its measurement.

Refer now to Fig. 5 which represents voltage-time curves of my apparatus. The voltage across the entire apparatus, which is 400 volts in the example given, is plotted as ordinates but the voltage from 200 to 225 volts is plotted on a greatly increased scale as compared to the voltage above and below these values. The zero voltage point is at ground potential in Fig. 4. The 74-voltage point is the voltage of the connection of grid 42. There is very closely 74 volts drop across the resistors 23 and 24 during a timing operation using condenser 20. The voltage between 74 and 200 is the initial charge on the condenser of 176 volts at the beginning of a timing operation. From 200 up to 225 volts is the time-measuring charging range of the condenser, and the voltage from the high side of the condenser to the high side of the line which is at 400 volts represents the voltage across resistor 25. The time axis (abscissa) is uniform and represents milliseconds. The apparatus is so arranged that condenser 20 will be charged from 176 to 201 volts in ten milliseconds, and C20, Fig. 5, represents the time-voltage curve for this condenser during a timing interval $t_1$ of 9 milliseconds. It is noted that the curve is a straight line because the charging rate is held constant. It is noted that at the end of the time interval the voltage represented by the horizontal extension of the curve does not drift to a lower value because no measurement or other current is drawn from the condenser. When condenser 33 and resistances 35 and 23 are used, the charging rate is again constant and such as to charge condenser 33 from 200 to 225 volts in 100 milliseconds. Curve C33 represents the time-voltage curve using condenser 33 where time intervals $t_2$, $t_3$, and $t_4$ are integrated. In other words, electronic switch 22 was opened momentarily during intervals $a$ and $b$ in producing curve C33. The integrated increase in condenser voltage is 22 volts and represents $t_2+t_3+t_4$, but on a time scale having a multiplication factor of 10 as compared to curve C20 or 88 milliseconds. The portions $a$ and $b$ of curve C33 may, of course, be very materially longer in time than is here represented without producing error in the integrated measurement because the condenser voltage does not drift to a lower value as it does in Fig. 2. Curve C34 represents a time measurement voltage curve using condenser 34 and its resistor, the timing interval being 740 milliseconds and producing an increase in condenser voltage of 18.5 volts.

In order to measure the voltage increase on the condenser at the end of a timing operation without drawing current from the condenser used, I may connect an ord'nary voltmeter between the high side of the condenser and ground and subtract its readings at the beginning and end of the time interval. Such a connection draws no current from the condenser because the condenser circuit is open at switch 22 and no current flows through the grid 42 connection. I prefer, however, to provide a voltmeter arrangement having the last-mentioned feature but which indicates only the voltage change on the condenser so that it reads zero at the beginning of the time interval and would read full scale for a 25-volt increase in condenser voltage. Such a voltmeter is represented at 44, connected from the upper terminal of the condenser through a resistance 45 to a point 46 on the voltage divider regulating circuit which is 150 volts above ground. Hence, a current w'll tend to flow through the voltmeter in the direction of the full line arrow proportional to the voltage difference between the upper terminal of the condenser and the 150-volt point 46.

I provide a connection 47 from the high side of the voltmeter through a resistance 48 to an adjustable tap on a resistor 49 shunted across voltage regulator glow tube 36. Current tends to flow through this connection from point 46 and the meter, as indicated by the dotted l'ne arrows. When the condenser used has the normal charge of 176 volts at the beginning of the time interval and its upper side is at 200 volts potential, I adjust the tap 49 so that no resultant current flows through meter 44 and it reads zero, and the other resistance values in its circuit are made such that it reads full scale when the voltage at the upper side of the condenser rises to 225 volts. Such meter may then be cal'brated directly in time units such as milliseconds and the proper multiplier used when using the different condensers.

To review briefly the operation of the device, the various tube circuits are energized and conditions adjusted as previously described. Range sw'tches 26 and 27 are thrown to the desired position. Switch 50 is closed momentarily to assure the proper initial condenser charge and voltage reference thereof. This may be checked by noting that voltmeter 44 reads zero. Switch 50 is then opened and the time measurement made by closing electronic switch 22 for the time interval to be measured at the end of which time the switch 50 is opened, these operations being controlled automatically through suitable apparatus represented at 29. The meter 44 is then read and the reading multiplied by the proper multiplier to be used. The apparatus is of high accuracy and convenience because of the novel features incorporated therein. Its accuracy is not influenced by ordinary voltage variations or ordinary changes in tube characteristics. The circuit elements and connections shown in Fig. 4 which have not been mentioned are to obtain the proper potentials on the different electrodes of the tubes and are in accordance with usual practice.

What I claim as new and desire to secure by Letters Patent of the United States is:

1. In a time interval meter, a condenser, a source of direct-current supply, a circuit including switching means for connecting said condenser in charging relation with said source during a time interval to be measured, means for assuring a definite initial charge on said condenser at the time of making such time measurement connection, and regulating means for maintaining the charging rate of said condenser constant during such time measurement connection.

2. In a time interval meter, a condenser, a direct-current source of supply, a circuit including resistance and switching means for connecting said condenser in charging relation with said source during a time interval to be measured, means for assuring a definite initial charge on said condenser at the beginning of the time interval measurement period, and regulating means including an electron discharge device having control grid, cathode and plate electrodes for maintaining the condenser charging rate constant during the time measurement condenser charging period, said device having its control grid connected to said charging circuit and having its grid-cathode voltage maintained in such relation during and subsequent to the time interval measurement period that negligible current flows in such grid connection.

3. Time measuring apparatus comprising in combination with a direct-current voltage supply, a condenser, a circuit including an electronic switch and resistance for charging said condenser from said source during a time interval to be measured determined by the closing and opening of said electronic switch, a cascade connected, grid controlled electronic tube circuit drawing current from said source of supply and through resistance connected in said charging circuit but not through said condenser for maintaining the charging rate of said condenser constant during the time interval to be measured, said cascade tube circuit having a grid control connection to said charging circuit which is maintained at such voltage during and at the termination of the time interval to be measured by the regulating operation of said cascade tube circuit that no appreciable current flows in said grid connection to or from the condenser charging circuit.

4. Time measuring apparatus comprising in combination with a direct-current source of supply voltage, a condenser, a charging circuit for said condenser including first and second resistances between which the condenser is connected in series and switching means for connecting said charging circuit to said source during the timing interval, regulating means drawing current from said source and through the first resistance but not the condenser for maintaining the charging rate of said condenser constant during the time interval to be measured, said regulating means comprising cascade connected, grid controlled electronic tubes one of which has its control grid connected between said condenser and the second resistance such that the grid control voltage of said tube is determined by the voltage drop through said second resistance during the condenser charging time interval, said grid control voltage being adjusted to have such a value both during a condenser charging time period and when said switching means is opened at the end of the charging period that no appreciable current flows to or from the condenser charging circuit through said grid connection.

5. Time interval measuring apparatus comprising in combination with a direct-current supply voltage source, a condenser, a charging circuit for said condenser including first and second resistances between which the condenser is connected in series and switching means for connecting and disconnecting said circuit to and from said source at the beginning and end of the time interval to be measured, an electron tube circuit supplied from said source and causing a flow of regulating current through said first resistance but not the condenser for maintaining the condenser charging rate constant during the time interval to be measured, said tube circuit including a tube having a control grid which is connected between the condenser and second resistance during the charging period and a cathode maintained at a substantially fixed voltage relative to its control grid such that negligible current flows to and from the condenser charging circuit through said grid connection, the voltage relation between said cathode and grid being further responsive to the voltage drop across said second resistance during the charging period.

6. A time interval meter comprising in combination with a source of supply, a condenser and a condenser charging circuit including switching means for connecting said circuit to and from said source of supply at the beginning and end of a time interval to be measured, regulating means including a resistance in said condenser charging circuit and means for passing a variable current through said resistance other than the condenser charging current for maintaining the charging rate of said condenser constant during a time interval measurement charging period, and means for obtaining a measurement of the rise in voltage across said condenser during a charging period without drawing current from said condenser comprising means for maintaining one side of said condenser at a fixed reference voltage relative to a terminal of said supply voltage, and means for measuring the voltage variation at the other side of said condenser relative to said terminal.

7. A time interval meter comprising in combination with a direct-current supply voltage, a condenser, a charging circuit for said condenser including first and second resistances between which the condenser is connected and a switch for connecting said charging circuit to the supply during the timing interval to be measured, a voltage divider circuit across said source with means for temporarily connecting one terminal of said condenser to an intermediate point on said voltage divider to establish a predetermined initial charge on said condenser prior to a time measurement operation, a regulator for maintaining the charging current of said condenser constant during a time measurement charging period during which time the charge on said condenser is increased, said regulator comprising grid controlled thermionic means for passing a decreasing current through the first resistance in the condenser charging circuit which is in addition to the condenser charging current therethrough to decrease the voltage drop thereacross as the condenser voltage increases to the extent necessary to keep the voltage drop through the second resistance constant, said regulator being controlled in response to the voltage existing between the condenser and said second resistance by a grid control connection to said thermionic regulator which voltage is adjusted for zero grid current flow.

8. A timing interval meter comprising in combination with a direct-current supply voltage, a condenser, a charging circuit for said condenser including first and second resistances between which the condenser is connected and switching means for connecting said circuit across the source during a timing interval to be measured, a regulator comprising cascade connected grid controlled electronic tubes for passing a variable regulating current through the first resistance which is in addition to any condenser charging current therethrough for maintaining the charging current of the condenser constant during a time interval measurement operation and to maintain the condenser terminal voltages fixed in relation to a terminal of the supply voltage following a time interval measurement operation, said regulator having a first grid controlled tube with its control grid connected between the condenser and the second resistance so that the regulator will respond to the voltage drop across the second resistance during a time interval measurement period and to the voltage existing at this point at the termination of such period, said tube having a cathode which has a fixed voltage relation to said supply source terminal, and the voltage relation between said cathode and control grid being adjusted to the zero grid current flow point, and means for measuring the increase in voltage across said condenser during a timing measurement period comprising means responsive to the voltage between the first resistance terminal of said condenser and said supply terminal of said source, said measuring means drawing its measurement current from said source and not from the condenser.

9. A multiple range time interval meter comprising a source of direct-current voltage, a plurality of condensers having different capacities, a charging resistance for each condenser, a charging circuit including a regulator resistance, and a switch for connecting the charging circuit across said supply source during a timing operation, selective switching means for including any one of said condensers with its charging resistance in said charging circuit, means for passing a regulating current through the regulator resistance in addition to any condenser charging current therethrough to control the voltage drop thereacross so that the charging rate for all condensers will be at substantially the same constant current charging rate, said regulator including a grid controlled electron discharge device having a cathode connected to a fixed voltage point of said voltage source and with its grid connected to the selective switching means such that such grid control will be automatically connected between the selected condenser and its charging resistance when such selection is made, the charging resistances being adjusted to make the grid control-cathode voltage relation of said electron discharge device such that negligible current flows in the grid control connection during the charging of any condenser.

10. In time measuring apparatus of the type where a condenser is charged from a direct current supply during the time interval to be measured, means for measuring the increase in voltage on the condenser during the measurement time interval without drawing current from the condenser comprising a condenser charging and control circuit which maintains a fixed voltage from one side of the source to one side of the measurement condenser prior to, during, and subsequent to a time interval measurement charging operation thereof, a switch for controlling the charging of such condenser connected in the charging circuit on the side of the condenser which is maintained at the fixed voltage, and a voltmeter connected in a circuit from the other side of said condenser in shunt to such condenser and switch such that it draws current from the supply source and not from the condenser and is subject to a voltage proportional to the increase in voltage on the condenser during a time interval measurement condenser charging operation.

11. In time measuring apparatus of the type where a condenser is charged from a direct current supply during the time interval to be measured, means for measuring the increase in voltage on the condenser during the measurement time interval without drawing current from the condenser comprising a condenser charging and control circuit which maintains a fixed voltage from one side of the source to one side of the measurement condenser prior to, during, and subsequent to a time interval measurement charging operation thereof, a switch for controlling the charging of such condenser connected in the charging circuit on the side of the condenser which is maintained at the fixed voltage, a voltmeter connected in a circuit from the other side of said condenser in shunt to such condenser and switch such that it draws current from the supply source and not from the condenser and is subject to a voltage proportional to the increase in voltage on the condenser during a time interval measurement condenser charging operation, and another circuit in shunt to said condenser and switch in parallel with said voltmeter for impressing a voltage on said voltmeter from said source which opposes the measurement voltage and is of such magnitude as to cause the voltmeter to read zero at the beginning of a time measurement condenser charging operation such that the voltmeter is responsive only to the increase in voltage on the condenser during such operation.

HOWARD L. CLARK.